April 14, 1970     C. F. EVANS     3,506,143
DUNNAGE BAG
Filed March 13, 1968     2 Sheets-Sheet 1
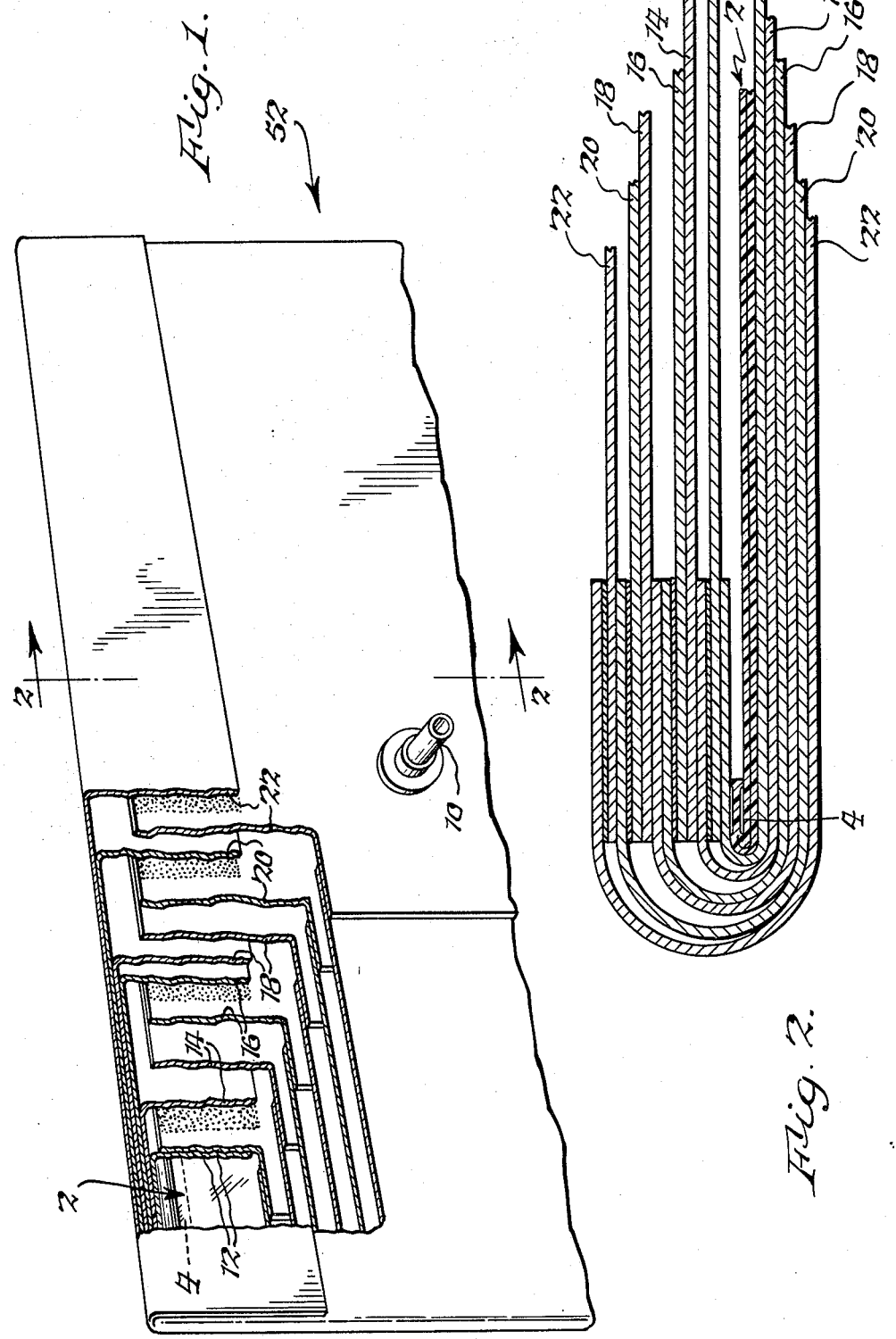

April 14, 1970  C. F. EVANS  3,506,143

DUNNAGE BAG

Filed March 13, 1968  2 Sheets-Sheet 2

United States Patent Office 3,506,143
Patented Apr. 14, 1970

3,506,143
DUNNAGE BAG
Carlton F. Evans, Ouachita County, Ark., assignor to International Paper Company, New York, N.Y., a corporation of New York
Filed Mar. 13, 1968, Ser. No. 712,858
Int. Cl. B65g 1/14
U.S. Cl. 214—10.5                                    5 Claims

ABSTRACT OF THE DISCLOSURE

An inflatable and disposable dunnage bag having an airtight bladder enclosed in a multi-ply container folded along parallel fold lines so that the bag, when not inflated, is flat with a back and front wall, the plies in the front wall of the multi-ply container and the plies in the back wall being joined to each other by flaps extending from the end of the plies in one of the walls and beyond the end of the plies in the other of the walls and being folded over the end of the containr and the airtight bladder and secured to the plies in the other of the container walls.

---

This invention relates to dunnage for use in shipment of freight by rail, ship, truck, aircraft, and the like, and, more particularly, to a disposable dunnage bag for such use.

When transporting freight by rail, ship, truck, aircraft, and the like, it is customary to fill or bridge the space left between the freight or walls of the freight carrying compartment to prevent the freight from shifting and damaging the freight and compartment. Preventing shifting and damage to the freight and compartment are, of course, important but the time, labor and costs involved in installing filling or bridging materials before shipmen, removing such materials after shipment and disposing of the removed filling or bridging materials has, heretofore, added substantially to shipping costs.

To reduce the time and labor of installation and removal, more recently inflatable dunnage bags have been used to bridge the space. The deflated bag is inserted into the space and inflated through a valve in the container wall. One such bag has been made of rubber and canvas and, because of the bag cost, is usually deflated and returned to the shipper for reuse. In order that such bag may be reused, it must, of course, be deflated and handled with care and must be accounted for and returned to the shipper. This adds to the cost of this type of bag.

Attempts to make a less costly bag which, after use, could be economically disposed of have met with limited success. One such attempt has been to form a multi-wall tube having outer walls of kraft paper, overlapped and glued longitudinally along the tube, with a bladder in the center of the tube of high density polyethylene, rubber or the like, and to seal the ends of the tube with rods and metal clamps. Such clamped end tubes, although less expensive than rubber a canvas, are not fully satisfactory because of the cost of the clamps. Moreover, such clamps are rigid and, unless such bag is properly positioned and handled, the rigid clamps can damage the freight container, and adjoining bags.

In the instant invention, a disposable dunnage bag is formed by enclosing an airtight bladder of high density polyethylene, rubber, or the like, in a multi-ply container. The multi-ply container is made up of a plurality of sheets, superimposed one over the other in the longitudinal or machine direction of the sheets. Each sheet is folded along parallel fold lines so that the sheet is flat with a back and front wall between the fold lines and with one of its longitudinal edges overlapping the other longitudinal edge. Where the longitudinal edges of each sheet overlap, the overlapped edges are glued to form a seam extending in the longitudinal, machine direction, of the sheet. Each outer sheet is folded, and the edge overlapped and glued, after the preceding inner sheet has been folded, lapped and glued so that, when all the sheets have been folded, overlapped and glued, the sheets are not connected to each other. When expanded, the sheets form a multi-wall or multi-ply tube with each inner sheet or ply in contact wth the immediately adjacent outer sheet so that the sheets, or plies, reinforce each other. The sheets may be superimposed, folded, edge lapped and glued on a tubing machine, preferably, with the overlapped seamed edges of the sheets offset with respect to each other so that the seam on one ply does not overlay the seam on the adjacent plies.

The airtight bladder which, when inflated expands, into contact wtih the inner wall of the inner ply is supported by the multi-ply walls of the container. A valve is attached to the bladder and extends through the walls of the container where it is accessible for inflating the container.

In the manufacture of the dunnage bag, the bag is flat and, for shipment and storage before use, may remain flat. The bladder, which may be a seamless tube of polyethylene, rubber or the like, cut to the desired length and glued or heat sealed at its opposite ends, a sheet folded at one edge and glued or heat sealed along its other three edges, or two sheets glued or heat sealed along all four edges, is inserted into the collapsed, or flattened, multi-wall container. The container is cut to a length to accommodate the bladder and the ends of the container are sealed by flaps extending from one side wall of the paper container sheets and glued to the other side wall. Preferably, when flat, the length and width of the container, at its inner wall are the same, or slightly smaller than, the bladder.

The invention will be understood from the following description and drawings, in which:

FIGURE 1 is a perspective view, in elevation of one end of the dunnage bag of the instant invention showing, partially broken away, the plies and flaps;

FIGURE 2 is a cross-sectional view taken along line 2—2 of FIGURE 1;

Figure 3:
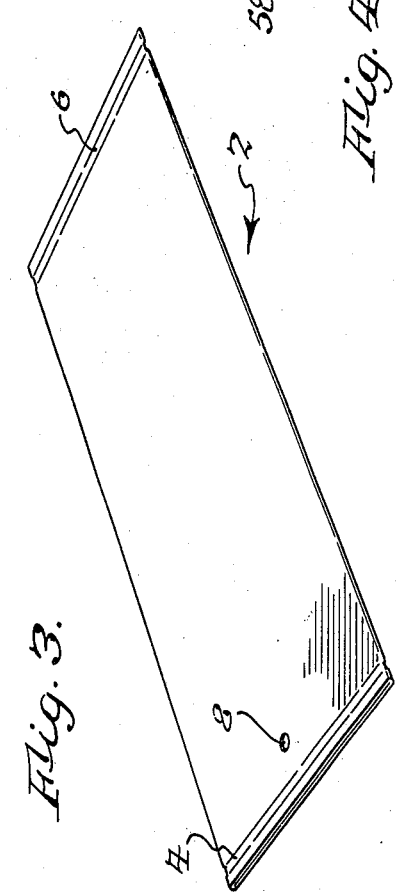
FIGURE 3 is a perspective plan view of the bladder of the bag of FIGURE 1.

Referring to FIGURES 1, 2 and 3 the bladder, generally designated 2, is cut to the desired length from a tube of air impervious material, such as polyethylene, and heat sealed, or glued, at its opposite ends along lines 4, 6. Hole 8, for receiving the end of valve 10, is cut in one wall of bladder 2 and valve 10 is attached and clamped, glued, or heat sealed to bladder 2, forming an airtight connection between valve 10 and the wall of bladder 2. Thus, when inflated through valve 10, as hereinafter described, bladder 2 expands and the air introduced into the bladder through valve 10 is entrapped and remains sealed in bladder 2 until valve 10 is opened or bladder 2 is torn or ruptured.

Bladder 2 is encased, or enveloped, in a multi-ply container made up by a plurality of sheets 12, 14, 16, 18, 20 and 22 superimposed, one over the other, and folded so that the longitudinal edges of each sheet overlap and the overlapped edges of each sheet are adhesively secured to form a longitudinal seam. Preferably, the sheets are folded and the longitudinal edges are overlapped and secured on a tubing machine with the overlapped seamed edges of the sheets staggered longitudinally of the tube with the seam of one tube offset relative to the seams of the adjacent tubes. In folding, lapping and securing the edges on a tubing machine, the multi-ply tube, formed in the preferred embodiment with six paper sheets or plies, is a continuous flattened tube from which the containers are cut in suitable length.

The width of the outer edge of flattened bladder 2 and each of the plies 12, 14, 16, 18, 20 and 22 is the same as, or slightly wider than, the width of the inner diameter of the next outer ply member. This is of substantial importance because, when inflated, the bladder does not stretch, is not weakened and is fully supported by the plies of the container.

When closed, the inner wall of the multi-ply container, at the opposite ends of bladder 2, is slightly shorter than the seal of bladder 2 so that the sealed ends 4, 6, at the ends of bladder 2 bear against the end of the multi-ply container or bladder 2 at the pressure side of sealed end 4, 6 bear on the end of the container. Thus, at its ends, bladder 2 is not stretched or weakened when the dunnage bag of the instant invention is inflated. Except for valve 10, which projects outwardly through the plies of the container, bladder 2, although contained within, is free of any connection to the container.

Referring to FIGURES 1 and 2, the plies at one wall of the flattened container are cut flush with, or slightly short of, the seal of bladder 2 and the plies at the opposite wall are cut at a distance beyond the end of bladder 2 to thereby form flaps. In closing the end of the container, an adhesive coating, such as polyethylene, a hot melt or pressure sensitive adhesive, is applied to the flap of each ply and the flap is folded over the open end and, with the adhesive, is secured to the ply at the opposite wall. Not all of the plies need be adhesively secured but, in order that the container have sufficient strength at its ends to withstand impact forced, at least three, and preferably four, of the flaps in a 6-ply container are adhesively secured. For example, in carrying out the invention, the flap on inner sheet 12 may be folded and, without adhesive, inserted into the end of inner ply 12 on the inner side of ply 12 of the flatttened container at the opposite wall. The flap of sheet 14, with adhesive, is then adhesively secured to the outer side of sheet 12 at the opposite wall of the flat container. Adhesive is next applied to the flap of sheet 16 and the flap of sheet 16 and the flap of sheet 18, without adhesive, are then folded and laid over the end of sheet 16 at the opposite wall of the flattened container and the flap of sheet 16 is adhesively secured to the outer side of sheet 16. Adhesive is next applied to the flap of sheet 20, the flap is folded and adhesively secured to the outer side of sheet 20 at the opposite wall of the flattened container. Finally, adhesive is applied to the flap of sheet 22 and the flap is folded and adhesively secured to the outer side of sheet 22. The flaps at the opposite end of the container are folded and adhesively secured in the same manner.

Figure 4:
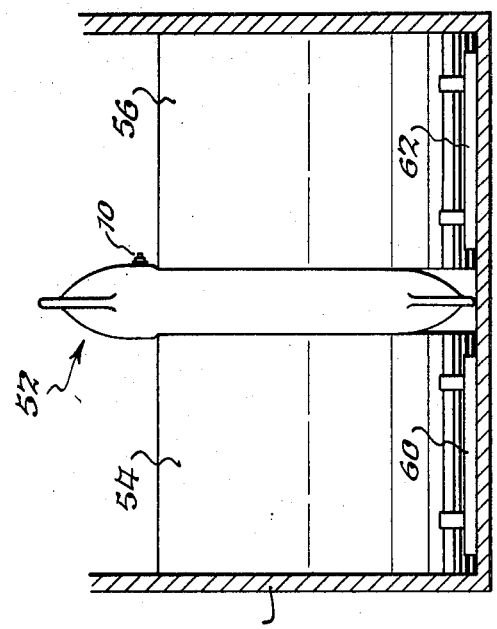
FIGURE 4 is a side view of the bag of FIGURE 1 showing the bag in place and inflated between the ends of paper rolls for shipment of the rolls.

Referring now to FIGURE 4, showing an inflated dunnage bag of the instant invention in place between the ends of paper rolls for shipment to the rolls, the bag of the instant invention, generally designated 52, is positioned between the ends of paper rolls 54, 56 in container 58 which may be a freight car, ship, truck or aircraft. Because paper rolls 54, 56 are round, the rolls are held from rolling by chocks 60, 62. Rolls 54, 56 may be rolled into place or placed in compartment 58 with a lift truck or other suitable handling equipment. Dunnage bag 52, which is deflated and flat, is inserted between the facing ends of rolls 54, 56 and, through valve 10, bag 52 is inflated to a pressure of about 8 lbs. p.s.i. to set the load. After the load is set dunnage bag 52 in deflated, through valve 10, to a pressure of from about 2 to 4 lbs. p.s.i. for shipment. By first inflating the bag to a higher pressure to set the load and, thereafter, deflating the bag to a lower pressure, the freight to be held by the inflated bag during shipment is moved into abutment with the container walls or other items of freight being shipped.

When the freight reaches its destination, the inflated bag 52 may be ripped open with a knife, freight hook or similar tool and, when ripped open, the bag rapidly deflates. The deflated bag can then be removed and disposed of, such as, by burning. Rapid deflation of the bag by tearing or ripping of the container avoids delays in unloading of the freight.

The strength of the bag of the instant invention will, of course, depend upon the strength and quality of the material in the plies of the multi-ply container. For most purposes for which the dunnage bag of the instant invention is intended, it is preferred to make the container from 100 lb. kraft paper sheets, with the outer sheet or ply coated with, for example, polyethylene, for weather and wear resistance. The container may, however, be made from other sheet materials, such as plastic sheets with or without reinforcement. Preferably, water resistant adhesives are employed in the manufacture of the bag.

The terms and expressions which have been employed are used as terms of description and not of limitation, and there is no intention in the use of such terms and expressions of excluding any equivalents of the features shown and described or portions thereof, but it is recognized that various modifications are possible.

What is claimed is:

1. An inflatable dunnage bag comprising a multi-ply container made up of a plurality of sheets superimposed one over the other and folded along parallel fold lines so that the sheets are flat between the fold lines forming back and front container walls between the fold lines and with one of the longitudinal edges of each sheet overlapped with, and adhesively secured to, the other longitudinal edge, an airtight bladder sealed at its opposite ends in said container, a valve in the wall of said bladder for inflating said bladder, said valve extending outwardly through one of said walls of said multi-ply container, the plies of one of said container walls, at the end of said bag, extending beyond the end of the plies of the other wall and forming flaps, the flap on the innermost ply immediately adjacent to said bladder being folded over the end of said bladder and tucked into the open end of said innermost ply between said bladder and the inner surface of the other wall of said innermost ply for frictional engagement with said inner surface as said bladder is inflated and for supporting the sealed end of said bladder at the pressure side of said seal when said bladder is inflated, the flap on the ply immediately adjacent to said innermost ply being folded over the end of said bladder and said flap on the innermost ply and tucked into the open end of said immediately adjacent ply and adhesively secured to the outer surface of said other wall of said innermost ply, the flap on the outermost ply being folded over the end of said bladder and the flaps on the inner plies and being adhesively secured to the outer surface of the outer wall of said outermost ply.

2. An inflatable dunnage bag, as recited in claim 1 in which said sheets are 100 pound kraft paper sheet and the outer sheet of said container is coated with polyethylene.

3. An inflatable dunnage bag, as recited in claim 2, in which said bladder is a polyethylene tube heat sealed at its opposite ends.

4. An inflatable dunnage bag, as recited in claim 1, in which certain of the flaps on the plies intermediate said ply adjacent to said innermost ply and said outermost ply are folded over the end of said bladder and the flaps on the plies inner thereto and tucked into the open end of the opposite ply wall between the inner wall of said opposite ply wall and the outer wall of the adjacent inner ply for frictional engagement with said inner wall of said opposite ply wall when said bladder is inflated.

5. An inflatable dunnage bag, as recited in claim 4, in which certain of the flaps on said intermediate plies are folded over the end of said bladder and the flaps on the plies inner thereto and adhesively secured to the outer surface of the opposite ply wall.

References Cited

UNITED STATES PATENTS

| | | | |
|---|---|---|---|
| 2,075,166 | 3/1937 | Brady | 229—55 |
| 3,072,270 | 1/1963 | Tolby et al. | 105—396 X |
| 3,199,689 | 8/1965 | Feldkamp | 214—10.5 |
| 3,243,822 | 4/1966 | Lipkin | 105—369 X |

FOREIGN PATENTS

| | | |
|---|---|---|
| 651,509 | 2/1929 | France. |

GERALD M. FORLENZA, Primary Examiner

F. E. WERNER, Assistant Examiner